(12) United States Patent
Stark et al.

(10) Patent No.: US 8,846,202 B2
(45) Date of Patent: Sep. 30, 2014

(54) FILM ARRANGEMENT

(75) Inventors: Kurt Stark, Neuhaus (DE); Karl Mauser, Leutenbach (DE); Roland Kelm, Forchheim (DE)

(73) Assignee: Huhtamaki Films Germany GmbH & Co. KG, Forchheim (DE)

( * ) Notice: Subject to any disclaimer, the term of this patent is extended or adjusted under 35 U.S.C. 154(b) by 0 days.

(21) Appl. No.: 12/704,826

(22) Filed: Feb. 12, 2010

(65) Prior Publication Data

US 2010/0183834 A1    Jul. 22, 2010

Related U.S. Application Data

(63) Continuation of application No. PCT/EP2008/060364, filed on Aug. 6, 2008.

(30) Foreign Application Priority Data

Aug. 14, 2007  (DE) .......................... 10 2007 038 473

(51) Int. Cl.
  *B32B 7/00*    (2006.01)
  *B32B 27/18*   (2006.01)
  *B32B 27/36*   (2006.01)
  *B32B 37/15*   (2006.01)

(52) U.S. Cl.
  CPC ............... *B32B 27/36* (2013.01); *Y10S 428/91* (2013.01)
  USPC .......... 428/480; 428/212; 428/910; 428/35.7; 428/195.1; 156/244.11; 264/173.11; 264/173.12; 524/379; 524/386

(58) Field of Classification Search
  None
  See application file for complete search history.

(56) References Cited

U.S. PATENT DOCUMENTS

| | | | | |
|---|---|---|---|---|
| 5,391,423 A | * | 2/1995 | Wnuk et al. | 428/217 |
| 5,662,938 A | * | 9/1997 | Vert et al. | 424/501 |
| 5,756,651 A | * | 5/1998 | Chen et al. | 528/354 |
| 5,849,374 A | * | 12/1998 | Gruber et al. | 428/34.3 |
| 5,849,401 A | * | 12/1998 | El-Afandi et al. | 428/215 |
| 5,936,014 A | * | 8/1999 | Voigt et al. | 524/51 |
| 5,939,467 A | * | 8/1999 | Wnuk et al. | 523/128 |
| 6,117,928 A | | 9/2000 | Hiltunen et al. | |
| 6,153,276 A | * | 11/2000 | Oya et al. | 428/35.2 |
| 6,248,430 B1 | * | 6/2001 | Toyoda et al. | 428/213 |

(Continued)

FOREIGN PATENT DOCUMENTS

| | | |
|---|---|---|
| CN | 1821303 A | 8/2006 |
| CN | 101195273 | * 6/2008 |

(Continued)

OTHER PUBLICATIONS

"Wikipedia—Molecular Mass" (http://en.wikipedia.org/wiki/Molecular_weight) webpage retrieved Dec. 13, 2013.*

(Continued)

*Primary Examiner* — Vivian Chen
(74) *Attorney, Agent, or Firm* — Norris McLaughlin & Marcus PA

(57) ABSTRACT

A transparent multi-layered film arrangement comprising at least three layers, wherein the film arrangement comprises one layer is made of a biodegradable polylactic acid (PLA) and a polyglycol as plasticizer, said polyglycol having a molecular weight of between 35,000 and 4,000,000, and at least two outer layers, each of said two outer layers being made of PLA.

16 Claims, 2 Drawing Sheets

(56) References Cited

U.S. PATENT DOCUMENTS

| | | | |
|---|---|---|---|
| 6,323,307 B1 * | 11/2001 | Bigg et al. | 528/354 |
| 6,372,324 B1 * | 4/2002 | Fujii et al. | 428/141 |
| 6,660,211 B2 * | 12/2003 | Topolkaraev et al. | 264/444 |
| 6,706,399 B1 * | 3/2004 | George et al. | 428/407 |
| 6,869,985 B2 * | 3/2005 | Mohanty et al. | 523/124 |
| 6,905,759 B2 * | 6/2005 | Topolkaraev et al. | 428/220 |
| 7,351,785 B2 * | 4/2008 | Matsumoto et al. | 528/354 |
| 7,514,503 B2 * | 4/2009 | Nakamichi et al. | 525/165 |
| 7,687,217 B2 * | 3/2010 | Tamagawa et al. | 430/124.53 |
| 2002/0160201 A1 | 10/2002 | Ohkura et al. | |
| 2003/0015826 A1 | 1/2003 | Topolkaraev et al. | |
| 2003/0021973 A1 | 1/2003 | Topolkaraev et al. | |
| 2003/0114937 A1 | 6/2003 | Leatherbury et al. | |
| 2003/0216496 A1 | 11/2003 | Mohanty et al. | |
| 2004/0209073 A1 | 10/2004 | Rosenbaum et al. | |
| 2005/0154148 A1 | 7/2005 | Nakamichi et al. | |
| 2005/0182201 A1 | 8/2005 | Matsumoto et al. | |
| 2007/0042207 A1 | 2/2007 | Berger et al. | |
| 2007/0154592 A1 * | 7/2007 | Dauchy et al. | 426/3 |
| 2007/0207282 A1 | 9/2007 | Hamann | |
| 2008/0131675 A1 | 6/2008 | Fackler et al. | |
| 2009/0134547 A1 * | 5/2009 | Bauer et al. | 264/211.12 |
| 2010/0183834 A1 | 7/2010 | Stark et al. | |

FOREIGN PATENT DOCUMENTS

| | | |
|---|---|---|
| DE | 33 05 198 A1 | 9/1983 |
| DE | 697 09 320 T2 | 7/2002 |
| DE | 10127314 A1 | 12/2002 |
| DE | 102 96 701 T5 | 4/2004 |
| DE | 697 32 721 T2 | 5/2006 |
| DE | 602 18 764 T2 | 7/2007 |
| DE | 603 07 536 T2 | 8/2007 |
| DE | 10 2007 026 719 A1 | 12/2008 |
| EP | 0 179 639 A2 | 4/1986 |
| EP | 0 474 376 A2 | 3/1992 |
| EP | 1 454 958 A1 | 9/2004 |
| EP | 1 514 902 A1 | 3/2005 |
| EP | 1 572 795 B1 | 8/2007 |
| JP | 2000-136300 A | 5/2000 |
| JP | 2003-041142 A | 2/2003 |
| JP | 2003191425 A | 7/2003 |
| JP | 2006-199799 A | 8/2006 |
| JP | 2007-177213 * | 7/2007 |
| WO | 94/28061 A1 | 12/1994 |
| WO | 98/09812 A1 | 3/1998 |
| WO | 01/68157 A1 | 9/2001 |
| WO | 01/098399 A | 12/2001 |
| WO | 01/98399 A1 | 12/2001 |
| WO | 02/072335 A1 | 9/2002 |
| WO | 02/085969 A2 | 10/2002 |
| WO | 2004/000939 A1 | 12/2003 |
| WO | 2006/053886 A2 | 5/2006 |
| WO | 2007/004906 A1 | 1/2007 |
| WO | 97/32929 A1 | 9/2007 |
| WO | 2008/021811 A1 | 2/2008 |
| WO | 2008/132488 A1 | 11/2008 |

OTHER PUBLICATIONS

"Wikipedia—Molar Mass Distribution" (http://en.wikipedia.org/wiki/Molar_mass_distribution) webpage retrieved Dec. 13, 2013.*

Romp Lexikon Chemie S. pp. 3447-3448.

Younes et al. "Phase Separation in Poly(ethylene Glycol)/Poly(Lactic Acid) Blends", Eur. Polym., J. vol. 24, No. 8, pp. 765-772 (1998).

Technology Focus Report: Blends of PLA with other Thermoplastics, NatureWorks, Ver. Feb. 7, 2007.

Division Functional Chemicals Polyalkykene_Polyethylene Glycols, pp. 1-24.

Opposition dated Jul. 1, 2010.

Hani Younes and Daniel Cohn , "Phase separation in polyethylene glycol/polylactic acid blends', European Polymer Journal", vol. 24/8, pp. 765-773, 1988.

Japanese Office Action Dated Jul. 20, 2012.

Translation of Japanese Office Action Jul. 20, 2012.

European Search Report dated Jun. 14, 2013.

Sheth et al., "Biodegradable Polymer Blends of Poly (lactic acid) and Poly (ethylene glycol)"; Journal of Applied Polymer Science, vol. 66, pp. 1495-1505, (1997).

Younes et al.; "Phase Separation in Poly(Ethylene Glycol)/Poly(Lactic Acid) Blends"; Eur. Polym. J., vol. 24, No. 8, pp. 765-773, (1998).

* cited by examiner

FILM ARRANGEMENT

This is a continuation of PCT/EP2008/060364 filed Aug. 6, 2008 now pending, which claims priority of DE 10 2007 038473.6 file Aug. 14, 2007. This invention relates to a specifically biodegradable film arrangement comprising at least one film ply.

BACKGROUND OF THE INVENTION

Various, specifically biodegradable film arrangements are known from the prior art. PLA films comprising a plasticizer are described therein, inter alia. Short-chain organic esters in particular are envisioned as plasticizers.

These film arrangements comprising PLA in particular, however, have the appreciable problem that, owing to the stiffness of PLA, they can only be used for a few applications. When plasticizers are added, the problem is that they very rapidly diffuse out of the plastics material or adversely affect the optical and the mechanical properties of the film. Use as a backsheet film in the hygiene sector, for example, is not possible, since only very soft and conformable films can be used there. Similarly, the known film arrangements are not suitable for the packaging sector. The flexibility, tensile strength, impact toughness and thermoformability needed there cannot be ensured. It is an object of the present invention to provide a film arrangement which can be used in the various application sectors and has high softness compared with known PLA films and film arrangements.

SUMMARY OF THE INVENTION

We have found that this object is achieved according to the present invention when the film arrangement is made at least from one film ply of a biodegradable PLA and a long-chain plasticizer.

This reduces stiffness and provides greater softness.

It will be found very advantageous when the plasticizer comprises a polyglycol, more particularly a polyethylene glycol, a polypropylene glycol or the like.

DETAILED DESCRIPTION

Polyglycols have proved to be ideal plasticizers for PLA. The object of the present invention is achieved by selecting long-chain plasticizers, against which there is a prejudice in the prior art. The prejudice in the prior art is that long-chain plasticizers would have an adverse effect on the stability of the plastics layer and that the plastic would become yellowish and/or cloudy. This was indeed observed in the past in the case of relatively large proportions of short-chain plasticizers.

It is also extremely advantageous, in accordance with a further embodiment of this invention, when the plasticizer comprises a modified polyglycol, more particularly a modified polyethylene glycol, a modified polypropylene glycol or the like and preferably is modified with functions such as a carboxylic acid function for example.

This improves the embedding of the plasticizer in the PLA.

It is extremely advantageous when the molecular weight of the plasticizer is greater than 8000, preferably between 20 000 and 4 000 000.

It is also very advantageous when the molecular weight of the plasticizer is between 25 000 and 400 000.

These plasticizer molecular weight values gave particularly good results in respect of softness. In addition, diffusion of the plasticizer out of the PLA is substantially suppressed, so that long durability times can be achieved.

In a further embodiment of this invention, it is extremely advantageous when the PLA is admixed with 0.01 to 40 weight percent, preferably with 5 to 25, more particularly with 10 to 20 weight percent of plasticizer.

The use of such low admixtures is sufficient to achieve the desired softness, which is comparable to LLDPE, LDPE and similar films.

It will also prove extremely advantageous in this invention when the PLA layer is accompanied by further layers.

Further layers make the film construction even more universally useful.

It will be found extremely advantageous when the layers are produced in the coextrusion blowing or coextrusion casting process.

Production is decisively simplified as a result.

It will be found extremely advantageous when the PLA layer is provided with at least one barrier layer.

The barrier layer means that the film arrangement can also be used as packaging material for sensitive food products or the like.

It is extremely advantageous according to this invention when the further layers are likewise biodegradable.

As a result, the biodegradability of the entire assembly is not impaired.

A further very advantageous development of this invention is also present when the PLA layer is embedded between at least two outer layers.

This provides additional protection for the PLA layer.

But it is also extremely advantageous when the film arrangement is constructed as a multilayered film construction having at least three layers wherein the two outer layers each consist of a PLA layer.

Again other uses become possible as a result.

It will also turn out to be extremely advantageous in this invention when the outer layers consisting of PLA do not contain any plasticizer, while at least one inner layer of a PLA with a plasticizer is provided.

It is likewise very advantageous when the outer layers have a small plasticizer content between 0.1 and 10%, more particularly between 0.1 and 5% and an inner layer of PLA has a higher plasticizer content.

Both the embodiments ensure that the blocking tendency between two or more films, which is due to plasticized PLA, is controlled. Nonetheless, the properties of the entire film are determined by the inner, plasticized PLA layer, so that the net result is a PLA film which is soft yet still has minimal if any tendency to block. The addition of further layers, which can also be formed from PLA, is conceivable.

It is also very advantageous according to this invention when the film arrangement is oriented.

This further improves the properties of the film.

It is likewise very advantageous when at least an outer layer of the film arrangement bears a printed image.

As a result, the film can be used directly as end packaging for goods, or alternatively patterns or the like can be provided on articles in the hygiene sector.

A very advantageous process for producing a film arrangement of this type is present when the PLA is extruder mixed and homogenized with the plasticizer.

This ensures a very uniform distribution of the plasticizer in the PLA.

It is likewise very advantageous in this invention when the PLA layer is coextruded together with further layers.

This makes it possible to produce a large portion of the film arrangement or else the entire film arrangement in a single operation.

It is very advantageous in this case for the film arrangement to be extruded in the casting process.

It is likewise very advantageous for the film arrangement to be extruded in the blowing process.

Either method of extrusion provides a simple way to produce single- and multilayered films.

It is very advantageous according to this invention for the film arrangement to be used for forming receptacles by thermoforming.

This makes it possible to produce biodegradable trays or else pots for packaging purposes.

It is likewise very advantageous when the film arrangement is sealed to further films or film arrangements.

This makes it possible to form bags, tubes or else wrap packaging.

It is also a further very advantageous embodiment of this invention when the film arrangement is used as backsheet film.

It is specifically in the hygiene sector, where backsheet films are used, that soft films and their biodegradability are important.

It will also turn out to be extremely advantageous in this invention when the film arrangement is used as robust covering film.

A multilayered construction makes it possible for the film arrangement to be accurately optimized to the requirements of a covering film.

BRIEF DESCRIPTION OF THE DRAWINGS

The invention will now be illustrated with reference to several embodiments.

Figure 1:
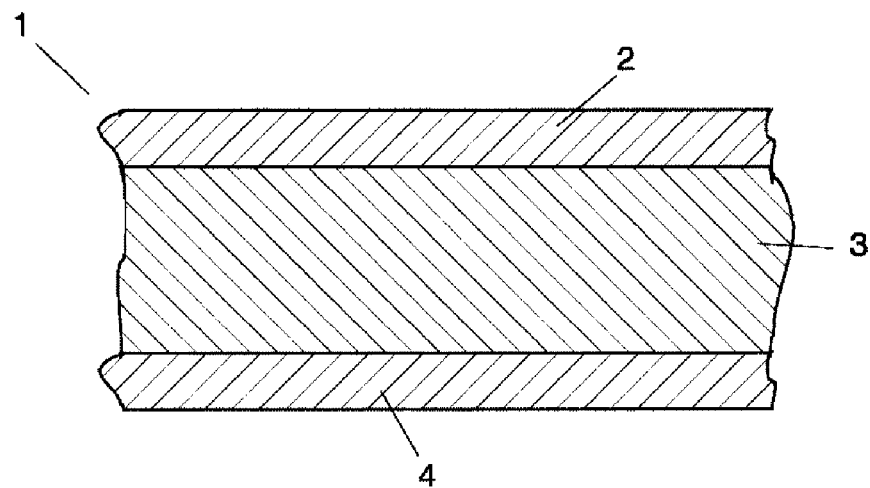
FIG. 1 shows a three-layered film construction with a plasticized PLA layer on the inside.
Figure 2:
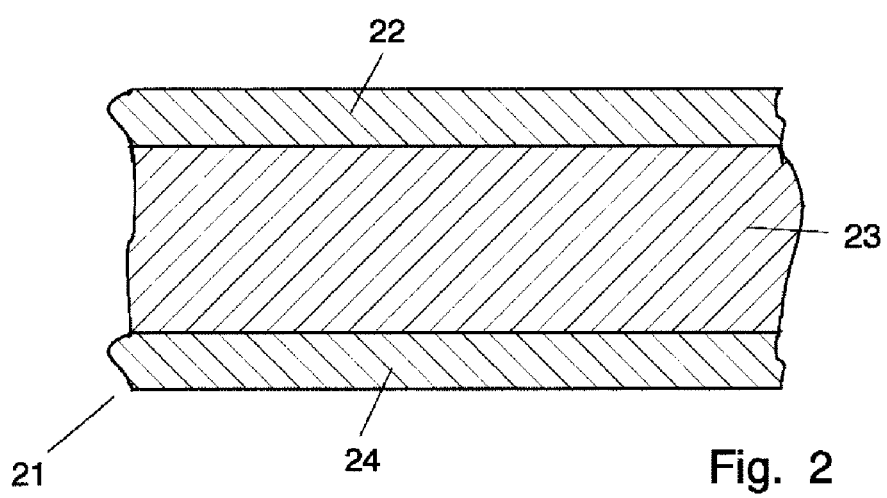
FIG. 2 shows a film construction with two plasticized PLA layers on the outside.

The reference numeral 1 in FIG. 1 identifies a film construction which consists of two outer covering layers 2 and 4. Between the covering layers 2 and 4 is a biodegradable PLA layer 3.

This PLA layer 3 is additized with plasticizers consisting of polyglycols, modified glycols or the like.

Long-chain polyglycols, particularly polyethylene glycol and polypropylene glycol having a molecular mass of greater than 8000 are used to prevent unintended diffusion out of the PLA. In this way, the PLA is kept soft by the plasticizers for a long period.

In the present example, very good results were obtained with a polyglycol having a molecular mass of 35 000 and 85 parts of PLA per 15 parts of PEG. The inner layer is 30 μm thick. The glass transition temperature Tg of the PLA-PEG batch is 36° C.

The covering layers 2 and 4 were likewise fabricated from PLA. In the process, 3% of antiblocking agent were added. The layers are each 10 μm thick. Tg is 65° C.

This film construction prevents blocking of two or more film layers in the rolled-up state for example. However, the properties of the overall film are determined by the inner layer, so that a very soft, yet stable and also thermoformable film is obtained.

It is to be noted that the inner layer 3, if wound up without the covering layers 2 and 4, would block if stored in the rolled-up state such that unrolling would no longer be possible.

The reason for this is the low glass transition temperature of a plasticized PLA. This low glass transition temperature is often exceeded in the course of storage, but at the latest for further processing in factory buildings, so that the layers of a roll virtually meld together into a single clump.

The proportion of additives in the outer layers 2 and 4 can be between 0 and 15%. Additives from the group consisting of dyes, optical brighteners, antiblocking agents, antistats, antifogging agents, slickers, UV absorbers, fillers, peeling and/or sealing additives, antioxidants and/or processing auxiliaries are conceivable. It is also conceivable for such additives to be provided in inner layers.

Further tests at a molecular mass of 20 000, 35 000 and 300 000 likewise gave very soft PLA films which are comparable to LDPE films and retained their softness for a prolonged period even at elevated temperatures. Here the proportion of polyethylene glycol was between 10 and 15%.

Owing to the high molecular weight, PEG migration is checked, and plasticizer performance is distinctly more effective compared with the low molecular weight grades. Higher molecular weight polyglycols are very useful in extrusion because of their high cohesion.

The transparency of the PLA film is excellent and is not impaired by the plasticizer.

To achieve this and hence to refute the prior art prejudice, first a batch between PLA and PEG having a higher PEG content was prepared. Further PLA is then added in the extruder, so that the desired ratio between PLA and PEG results. For instance, 70% of the batch can be mixed with 30% of PLA to arrive at the ratio of 85:15.

This overcomes prejudices in the general prior art whereby the use of PLA is negatived because of excessive diffusion in the case of relatively small molecular masses or optical impairments in the case of relatively large molecular masses.

This prejudice is overcome by ensuring a very uniform and homogeneous distribution of the polyglycol in the PLA by mixing in the extruder. However, it is also conceivable first for a relatively small proportion of the plasticizer to have been added and for further plasticizer to be added only shortly prior to the extrusion in order that the desired concentration may be achieved.

The PLA film can be extruded alone or else be coextruded together with further layers.

The plasticizers render the PLA layer 3 more permeable to water vapor and gases. It is therefore conceivable for at least one of the two covering layers 2 and 4 to be configured as a barrier layer which prevents this water vapor and gas transmission. However, it is also conceivable for further layers also configured as a barrier layer to be provided between the PLA layer 3 and the covering layers 2 and 4. Barrier layers to UV irradiation, water vapor and oxygen are conceivable.

However, it is also conceivable for two PLA layers 22 and 24 to be provided as outer layers of a film construction 21 for other uses, and for the two PLA layers 22 and 24 to include therebetween a further film layer 23 which can be configured as a barrier layer. With an embodiment of this kind, however, it is usually sensible to add comparatively little PEG plasticizer to the PLA in order that the glass transition temperature can be kept high to avoid blocking. The Tg of pure PLA is between 60 and 65° C. The Tg of plasticized PLA has a Tg below 55° C., more particularly below 45° C., at the desired softness.

Further layers are conceivable. The outer PLA layers 22 and 24 may also include a low plasticizer content of about 2-5%, which means that the tendency to block to further films in the course of winding or stacking for example is still minimal. The glass transition temperature is still very close to that of pure PLA. By adding the aforementioned antiblock agents, the blocking tendency can be reduced once more in this case as well.

The layers 2, 4 and 23 are preferably likewise made of biodegradable raw materials, more particularly PLA.

Figure 3:
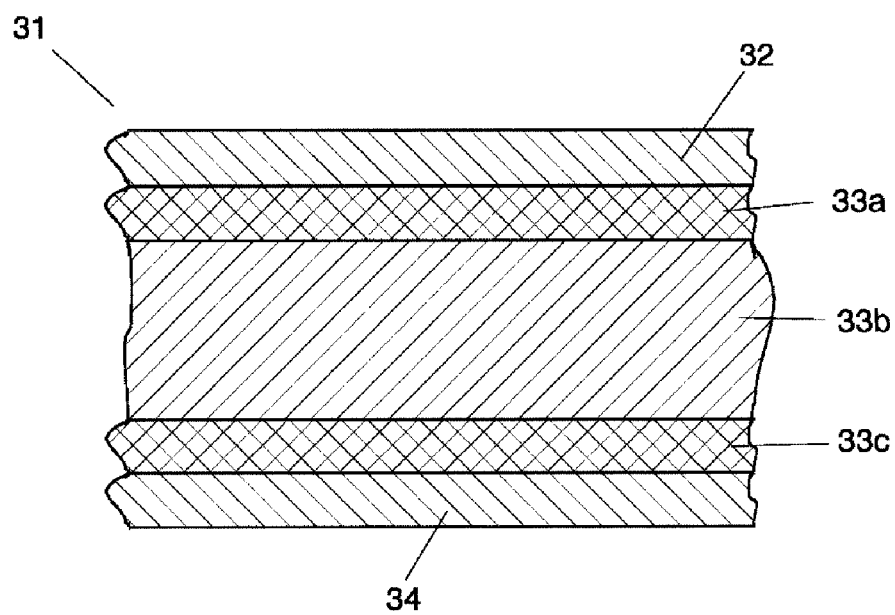
FIG. 3 shows a five-layered film construction with several plasticized PLA layers on the inside.

A five-layered construction 31 as depicted in FIG. 3 is also conceivable. It utilizes two covering layers 32 and 34, which are each fabricated from PLA using 3 percent of antiblocking agent and have a thickness of 12 μm. The inner layers 33a, 33b and 33c are three PLA-PEG layers having an 85:15 ratio for PLA to PEG. The layers 33a and 33c are each 14 μm thick. The layer 33b has a thickness of 48 μm.

In the table below, this film is compared with a likewise five-layered PLA film which does not contain any plasticizer in the layers 33a, 33b and 33c but otherwise has the same construction.

| Test | Film of FIG. 3 | Standard PLA film |
|---|---|---|
| Tensile-impact toughness md/cd | 91 KJ/m$^2$/123 KJ/m$^2$ | 49 KJ/m$^2$/49 KJ/m$^2$ |
| Cuttability | very good | poor (splintering) |
| Modulus of elasticity md/cd | 2002 N/mm$^2$/2157 N/mm$^2$ | 2857 N/mm$^2$/3396 N/mm$^2$ |
| Tensile strength | 65.5 N/mm$^2$/57.4 N/mm$^2$ | 64.5 N/mm$^2$/72.95 N/mm$^2$ |
| Elongation at break | 4.24%/5.5% | 2.49%/3.44% |
| Blocking test | no blocking | no blocking |
| Tongue tear strength md/cd by limb method | 8.6 N/5.7 N | 3.2 N/2.6 N |
| Tongue tear strength md/cd by trapeze method | 44.3 N/39.3 N | 11.4 N/10.6 N |
| Migration | none | none |

The mechanical properties of the film of the present invention are appreciably improved compared with a standard PLA film without any apparent disadvantages on the part of the film of the present invention. The tensile-impact toughness of the biodegradable film of the present invention is improved by a factor of 2-3 compared with the pure PLA film. Similarly, the higher elasticity of the film of the present invention is reflected in an increased elongation at break. The higher flexibility is reflected in reduced moduli of elasticity. The cuttability of the biodegradable film of the present invention is distinctly better in that any cut is absolutely clean and no splintering occurs. As far as tongue tear strength is concerned, an appreciable improvement over the pure PLA film is observed. Tongue tear strength by the trapeze method improves by a factor of 4.

The inventive film as per FIG. 3 exhibits a remarkably high transparency. Similarly, there is no migration of the plasticizer. Blocking between two identical films is not observed with any of the two films.

Specifically in the case of food packaging the splintering of film material on opening a package was an appreciable problem in the case of PLA films in that it prevented their being used in this application.

The film arrangement can include still further layers, be laminated together with other films or film constructions, fibrous nonwoven webs, papers, metal foils or the like, or be welded or sealed to itself or other films.

Owing to the high softness of the PLA, the films of the present invention can be used not only for packaging, more particularly food packaging as thermoformed trays, pots, tubular bags, lid films and so on, but also in the hygiene sector more particularly as backsheet films in the case of sanitary articles such as sanitary napkins, diapers or the like.

Other uses are conceivable. For instance, the film of the present invention is particularly useful for diapers and bags which are disposed of after use. In the agricultural sector, a film of this kind can be used as a mulch film for example. Similarly, the use as wrap film or as adhesive tape film is also conceivable.

The invention claimed is:

1. A transparent multi-layered film arrangement comprising at least three layers, wherein the film arrangement comprises:
    one layer made of a biodegradable polylactic acid (PLA) and a polyglycol as plasticizer, said polyglycol having a molecular weight of between 35,000 and 4,000,000, and said polyglycol consisting of units derived from ethylene glycol, propylene glycol, or a mixture thereof; and
    at least two outer layers, each of said two outer layers being made of PLA.

2. A film arrangement according to claim 1, wherein the plasticizer is a polyethylene glycol or a polypropylene glycol.

3. A film arrangement according to claim 1, wherein the molecular weight of the polyglycol plasticizer is between 35,000 and 400 000.

4. A film arrangement according to claim 1, wherein the PLA is admixed with 0.01 to 40 weight percent of plasticizer.

5. A film arrangement according to claim 1, wherein the biodegradable PLA layer is accompanied by further layers which are likewise biodegradable.

6. A film arrangement according to claim 5, wherein the film is provided with at least one barrier layer.

7. A film arrangement according to claim 1, wherein the outer layers of PLA do not contain any plasticizer, while at least one inner layer of PLA does contain the plasticizer.

8. A film arrangement according to claim 1, wherein the outer layers have a small plasticizer content between 0.1 and 10%, and an inner layer of PLA has a higher plasticizer content than the outer layers.

9. A film arrangement according to claim 1, wherein at least one additive selected from the group consisting of dyes, optical brighteners, antiblocking agents, antistats, antifogging agents, slickers, UV absorbers, fillers, peeling additives, sealing additives, antioxidants processing auxiliaries and combinations thereof is present at least in an outer layer of the film arrangement.

10. A film arrangement according to claim 1, wherein the film arrangement is oriented.

11. A film arrangement according to claim 1, wherein at least an outer layer of the film arrangement bears a printed image.

12. A process for producing the film arrangement of claim 1, wherein the biodegradable PLA is extruder mixed and homogenized with the plasticizer and the PLA layer containing said plasticizer is coextruded together with further layers.

13. Method for forming receptacles which comprises thermoforming the film arrangement of claim 1 to form a receptacle.

14. Method of claim 13, wherein the film arrangement is sealed to further films or film arrangements.

15. Method of claim 13 wherein the film arrangement is used as backsheet film for sanitary articles.

16. Method according to claim 14, wherein the film arrangement is used as backsheet film for sanitary articles.

* * * * *